United States Patent [19]
Kulaga

[11] Patent Number: 4,946,127
[45] Date of Patent: Aug. 7, 1990

[54] THEFT RESISTANT ROTATABLE MOUNT FOR COMPUTER CONSOLES AND THE LIKE

[75] Inventor: Mark Kulaga, Lombard, Ill.

[73] Assignee: Ark International, Inc., Lisle, Ill.

[21] Appl. No.: 464,527

[22] Filed: Jan. 12, 1990

[51] Int. Cl.⁵ .......................................... F16M 13/00
[52] U.S. Cl. .................................. 248/551; 248/186; 248/349; 248/415; 248/922
[58] Field of Search ............... 248/349, 551, 552, 553, 248/186, 183, 178, 415, 664, 919, 920, 921, 922, 923; 70/58; 108/94

[56] References Cited

U.S. PATENT DOCUMENTS

| | | | |
|---|---|---|---|
| 3,291,432 | 12/1966 | Lucasey | 248/921 X |
| 3,321,165 | 5/1967 | Wann | 248/922 X |
| 3,908,942 | 9/1975 | Keith | 248/922 X |
| 4,143,927 | 3/1979 | Spear | 248/551 X |
| 4,305,266 | 12/1981 | Lockwood | 70/58 |
| 4,542,872 | 9/1985 | Marino | 248/349 X |
| 4,579,311 | 4/1986 | Spranza | 108/94 |
| 4,613,109 | 9/1986 | Boscacci | 248/553 |
| 4,635,894 | 1/1987 | Sammons | 248/922 X |
| 4,697,778 | 10/1987 | Harashima | 248/415 X |
| 4,852,830 | 8/1989 | Howard | 248/183 |

FOREIGN PATENT DOCUMENTS

| | | | |
|---|---|---|---|
| 1576666 | 6/1969 | France | 248/922 |
| 6516278 | 6/1967 | Netherlands | 248/922 |

Primary Examiner—J. Franklin Foss
Attorney, Agent, or Firm—Marshall, O'Toole, Gerstein, Murray & Bicknell

[57] ABSTRACT

A rotatable, theft-resistant mount for office instruments such as computer consoles in accordance with the invention comprises a base having two vertically stacked sections. The lower section is generally circular with a depression in the middle of its upper surface. The upper section has a matching circular surface defined by a depending rim which nests over the circular lower section, and a depending stud rotatably affixed in its lower surface which mates with the depression in the upper surface of the lower section. The lower section is also provided with a diametrical tubular passage passing through the central depression. The depending stud affixed to the upper section is provided with a hole through which an elongated locking rod positioned within the tubular passage extends, thus preventing the upper section of the base from being separated from the lower section, while permitting relative rotation of the two sections.

8 Claims, 2 Drawing Sheets

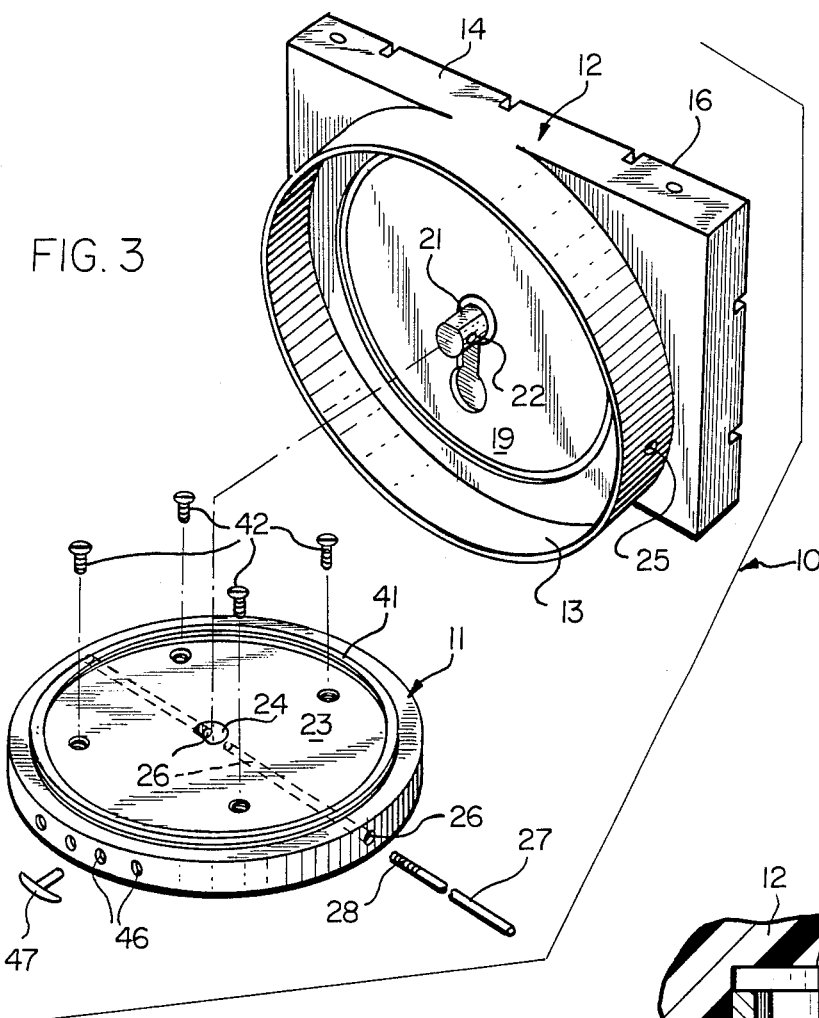
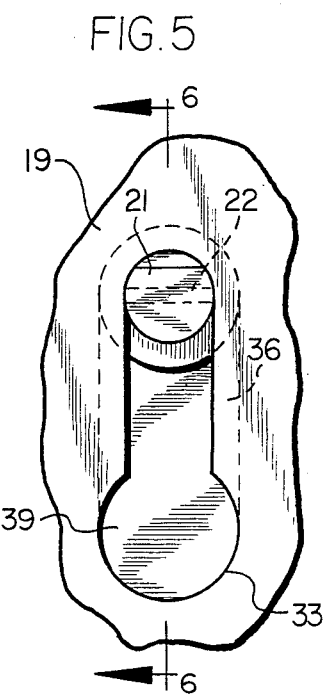
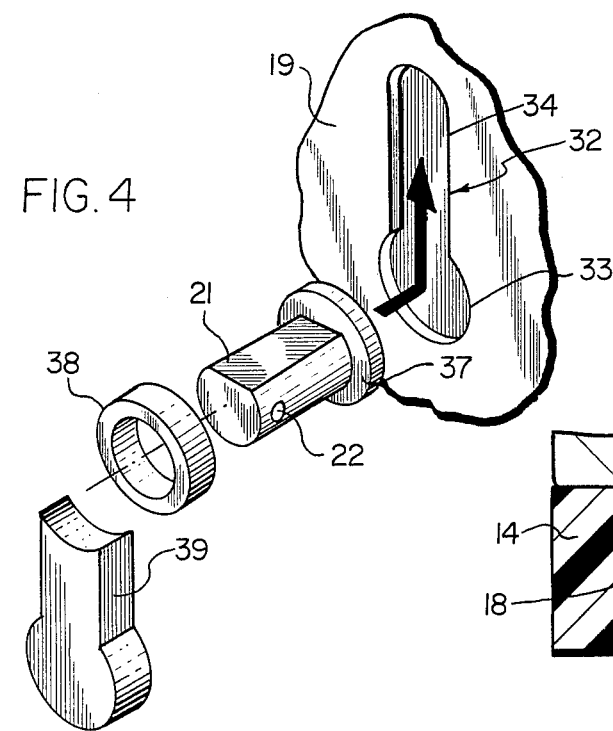
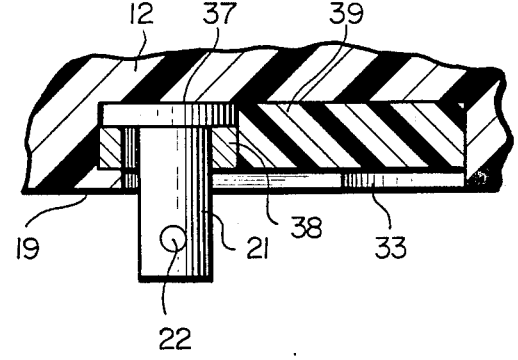
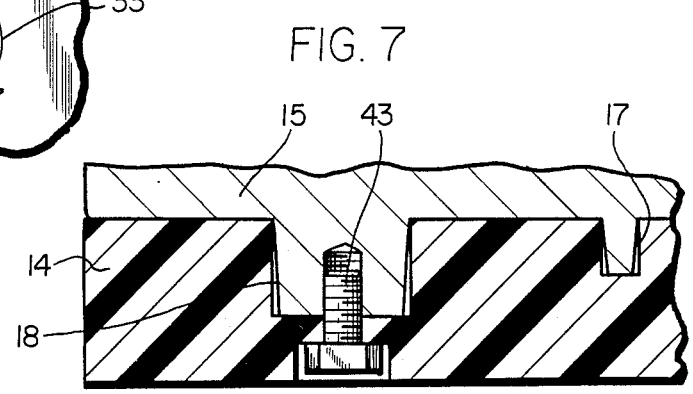

THEFT RESISTANT ROTATABLE MOUNT FOR COMPUTER CONSOLES AND THE LIKE

The present invention relates to a theft-resistant mount for rotatably mounting an instrument such as a computer console or the like on a stand or other support.

BACKGROUND OF THE INVENTION

During the use of certain types of instrument, such as computer consoles, TV screens, and the like, it is desirable to be able to rotate the equipment to obtain the best viewing angle. At the same time, it is desirable to be able to attach the equipment to its associated stand in a manner which inhibits theft yet which permits the equipment to be easily rotated. As a further consideration, it is also desirable to accomplish these ends with apparatus which is simple in construction and economical in cost.

BRIEF DESCRIPTION OF THE INVENTION

A rotatable, theft-resistant mount for office instruments such as computer consoles in accordance with the invention comprises a base having two vertically stacked sections. The lower section is generally circular with a depression in the middle of its upper surface. The upper section has a matching circular surface defined by a depending rim which nests over the circular lower section, and a depending stud rotatably affixed in its lower surface which mates with the depression in the upper surface of the lower section. The lower section is also provided with a diametrical tubular passage passing through the central depression.

The depending stud affixed to the upper section is provided with a hole through which an elongated locking rod positioned within the tubular passage extends, thus preventing the upper section of the base from being separated from the lower section, while permitting relative rotation of the two sections. It is preferred to position a rotary bearing between the contiguous surfaces of the upper and lower sections to permit the sections to rotate freely relative to each other without binding or wobbling.

In use, the lower section of the base is rigidly attached to a stand or other support by means passing through its upper surface downwardly into the stand. Similarly, the object to be supported (hereinafter the "instrument") is attached to the upper base by means passing upwardly through the lower surface of the upper base. Accordingly, when the sections of the base are assembled, the attaching means holding the sections of the base to the mount and to the instrument, respectively, are inaccessible, thus preventing removal of the instrument from the mount except by removing the elongated rod which interconnects the sections of the base.

DESCRIPTION OF THE DRAWINGS

The invention will be better understood from the detailed description which follows, taken in conjunction with the accompanying drawings in which:

FIG. 3 is an exploded view of the components of the base, i.e., the upper section, the lower section, and the rod which interconnects them;

FIG. 4 is a detail of one appropriate way of attaching the dependent lug to the lower surface of the upper section in a manner which permits the stud to rotate but not to pull out of the surface;

FIG. 5 is a detail view of a portion of the lower surface of the upper section of the base showing the rotatable lug in position;

FIG. 6 is a sectional view along the lines 6—6 of FIG. 5; and

FIG. 7 is a detail view of one way of attaching the computer console to the upper surface of the base.

Figure 1:
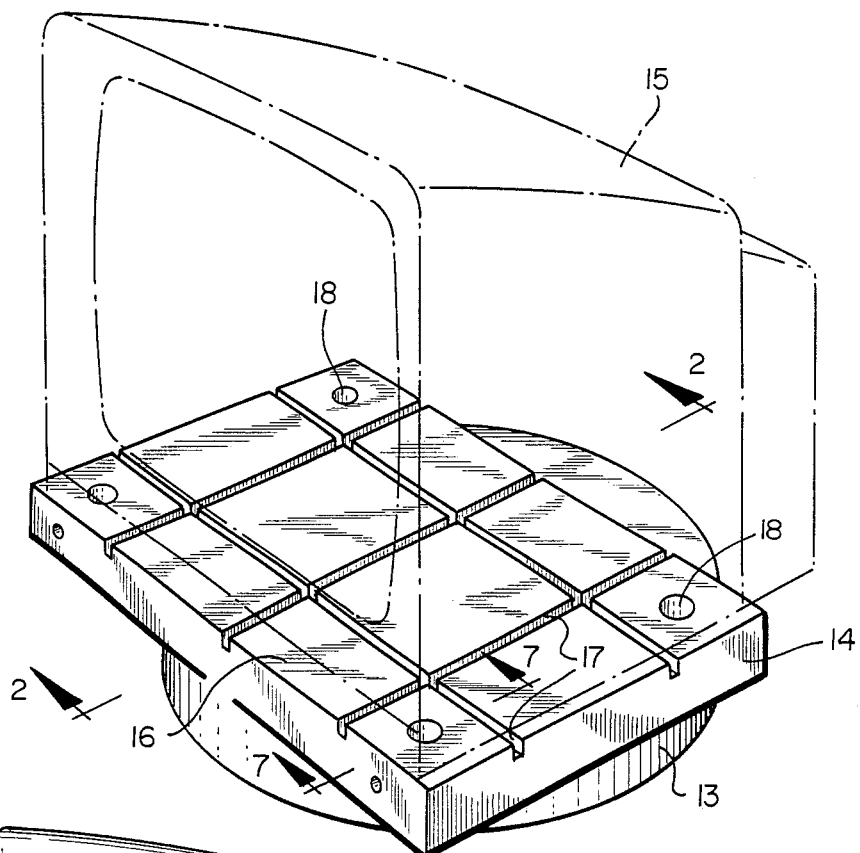
FIG. 1 is a perspective view of the mount of the invention showing in phantom outline a computer console or the like with which it might be used.

As shown in the drawings, the theft-resistant rotatable mount 10 of the invention comprises two sections which can be separated when desired but which in normal operation are interconnected to permit relative rotation thereof. Mount 10 comprises a generally circular plate-like lower section 11 and an upper section 12 having a corresponding circular surface defined in part by a circular depending rim 13 sized to nest snugly over the outer edge of the lower section. Attached to the upper portion, upper section 12 is a mounting plate 14 having a surface 16 adapted to receive the instrument 15 to be supported. The particular configuration of surface 16 depends on the identity and nature of the instrument and does not per se form a part of the invention. In the configuration shown in FIG. 1, upper surface 16 of plate 14 is provided with rectangular grooves 17 and circular depressions 18 adapted to receive a particular model of computer console. Surface 16 could have a different configuration appropriate for use with other instruments.

Attached to the center of the lower circular surface 19 in upper section 12 is a depending stud 21 which freely rotates in place but which cannot be removed when the mount is assembled except by application of destructive force. Stud 21 is provided with a transverse hole 22 which extends completely through the thickness of the stud. The upper surface 23 of lower section 12 is provided at its center with a recess 24 adapted to receive stud 21 and thus to permit sections 11 and 12 to nest snugly together.

Figure 2:
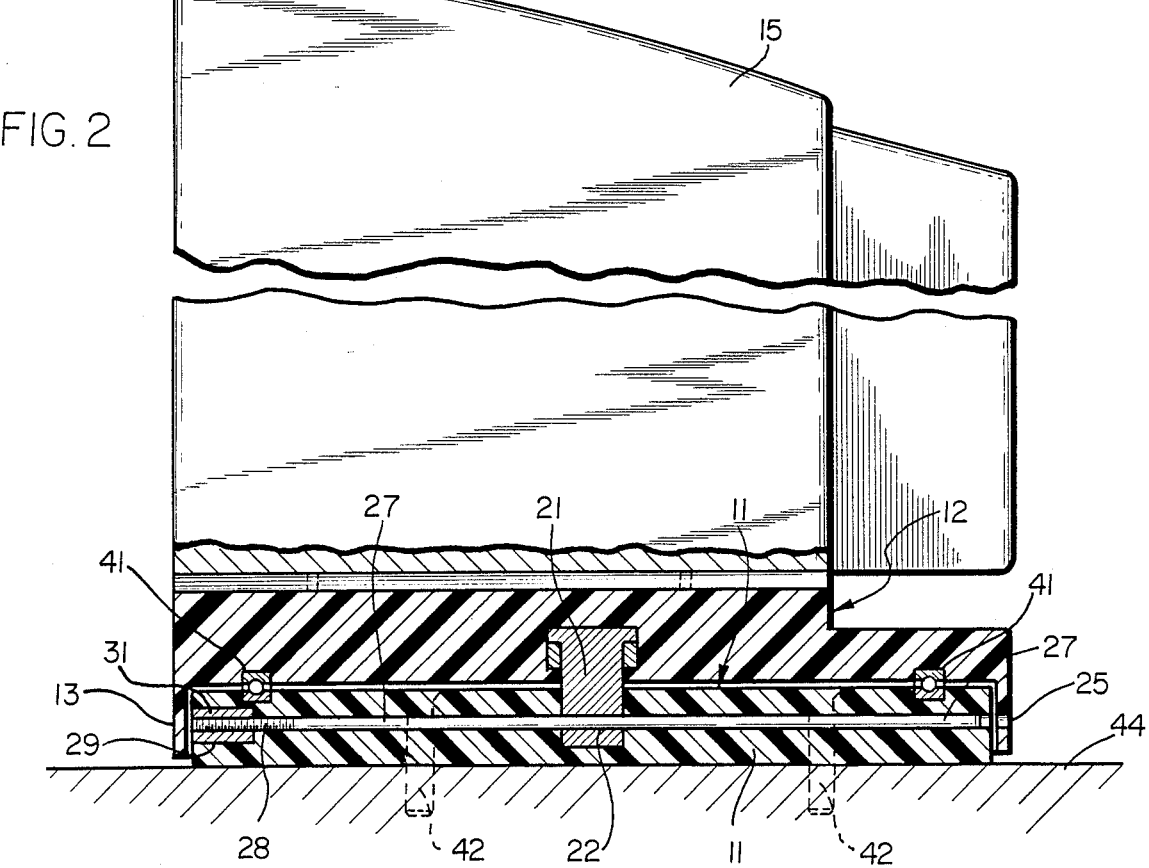
FIG. 2 is a view from the right side of the embodiment of FIG. 1 in partial section showing the interconnection between the upper and lower sections of the base.

Lower section 11 is also provided with a tubular passage 26 extending diametrically through recess 24, into which an elongated locking pin 27 can be inserted. It is preferred to provide both recess 24 and stud 21 with mating noncircular, cross-sectional outlines such that when stud 21 is inserted into recess 24, the stud is oriented in a position causing hole 22 to be aligned with passage 26, permitting locking pin 27, inserted through an appropriately situated opening 25 in rim 13 to pass through stud 21. The end of locking pin 27 which is inserted into tubular passage 26 is provided with means, e.g., threads 28, for engaging a locking means 29 (FIG. 2) located within tubular passage 26 at a point opposite its entrance. In FIG. 2, locking means 29 is represented by a threaded nut 31 into which the threads 28 of pin 27 are received. The opposite end of pin 27 is provided with means (not shown) for rotating the pin into locking engagement with nut 31. In order to make removal of pin 27 as difficult as possible, except by authorized personnel, it is desirable to make the rotating means in the end of the pin a nonstandard shape or form, requiring a specially designed driver, the particular nature which is not critical. In addition, in order to inhibit removal of pin 27, it is desirable to have its end when completely inserted lie entirely within passage 26 and substantially below the outer surface of lower section 11.

One embodiment of suitable means for rotatably attaching stud 21 to upper section 12 is illustrated in FIGS. 4, 5, and 6. The invention is, of course, not restricted to the particular means shown in these drawings since other suitable mechanical embodiments will be apparent to those skilled in the art. As shown, lower surface 19 of upper section 12 is provided with a slot 32 having an enlarged circular portion 33 at one end, to which is joined a narrower slot 34 provided with an undercut portion 36 having a width equal to the diameter of the circular portion 33.

Stud 21 is provided at one end with a circular flange 37 which can be inserted in circular portion 33 of slot 32. A resilient washer 38 having an inner diameter equal to that of the diameter of stud 21 is then slipped over the stud and the assembly is moved vertically, as shown in FIG. 4, to the narrow upper end of slot 32. A resilient filler plug 39 is then inserted in the open portion of the slot, thus preventing the removal of the stud assembly from the surface. It will be seen that in the condition shown in FIG. 6, stud 21 can rotate freely relative to upper section 12 but cannot be separated therefrom without destruction of the assembly or removal of washer 38 and filler plug 39.

In order to facilitate smooth rotation of the upper and lower sections of the base relative to each other, particularly when the supported instrument is relatively heavy, it is desirable to provide an appropriate bearing means, e.g., ball-bearing 41, between the opposing surfaces of upper and lower sections 11 and 12. While the use of such a bearing is preferred, it is not necessary in all cases since other methods of facilitating rotation, e.g., the use of slippery plastic facings on the sections, can also be employed.

In order to attach lower section 11 to a stand 44, it is preferred to employ fastening means, e.g., screws or bolts 42 as shown in FIGS. 2 and 3, which when installed are covered by the upper section 12 of the mount. As shown in FIG. 2, screws 42 pass through lower section 11 and into the stand and cannot be removed to release the assembled base 10 without first removing upper section 12.

Similarly, in order to attach instrument 15 to upper section 12 of the base, it is preferred to use attaching means, e.g., bolt 43 (FIG. 7), which pass vertically through plate 14 of upper section 12 into instrument 15. Thus, when the upper section is joined to lower section 11, attaching means 43 are covered and cannot be easily removed.

The operation of mount 10 will be obvious from the description which has been given. After lower section 11 of the mount is attached to stand 44, and the upper section 12 of the mount is attached to instrument 15, as described, the upper and lower sections are nested together, and locking pin 27 is inserted into tubular passage 26 through the opening 25 in rim 13, through stud 21 and into engagement with nut 31 on the far side of the passage. The two sections of the mount are thus interconnected to prevent separation thereof while permitting free rotation.

It is sometimes desirable to be able to lock the attached instrument at a particular angular position on the stand. For this purpose, the outer rim of lower section 11 may be provided with a plurality of relatively shallow holes 46 (FIG. 3) having a size similar to that of opening 25 in rim 13 in upper section 12 and located so as to register with opening 25. By rotating the upper section to the desired location and with opening 25 in registry with a desired one of openings 46 in the lower section, a positioning pin 47 can be inserted through rim 13 into lower section 11, holding upper section 12 in the desired position.

The foregoing detailed description has been given for clearness of understanding only, and no unnecessary limitations should be understood therefrom, as modifications will be obvious to those skilled in the art.

I claim:

1. A theft-resistant mount for rotatably mounting an instrument on a stand comprising:
   a lower section adapted to be fixedly mounted on said stand, said lower base having a horizontal circular upper surface provided with a central recess;
   an upper section having a lower surface defined in part by a circular depending rim adapted to nest over said lower base section, said upper section having an upper surface adapted to receive said instrument;
   said upper section having a rotatably mounted stud depending from its lower surface and adapted to enter said recess when said upper and lower sections are nested;
   said stud having a hole extending transversely through the stud;
   said lower section having a diametrical tubular passage intersecting said recess and registering with said hole in said stud when said upper and lower sections are nested;
   an opening in said depending rim adapted to register with said passage; and
   an elongated locking pin adapted to enter said passage through said opening in said outer rim and to engage said hole in said stud, whereby separation of said upper and lower base sections is prevented without inhibiting relative rotation thereof.

2. The mount of claim 1 further provided with a circular bearing interposed between the lower surface of said upper section and the upper surface of said lower section for facilitating relative rotation of said sections.

3. The mount of claim 1 further including locking means located within said passage and adapted to engage one end of said locking pin.

4. A mount in accordance with claim 3 wherein said locking means comprises a threaded nut adapted to engage threads formed on said one end of said locking pin.

5. A mount in accordance with claim 4 wherein the end of said locking pin opposite said one end has a configuration requiring a matching driver for rotating said pin into engagement with said nut.

6. A mount in accordance with claim 4 wherein the length of said locking pin is substantially less than the diameter of said lower section, and said nut is so positioned that the end of said locking pin opposite said one end is located within said tubular passage when said pin and said nut are engaged.

7. A mount in accordance with claim 1 wherein said lower section is provided with a plurality of relatively shallow holes registering with the opening in said rim for positioning said upper section in any of a number of desired orientations.

8. A mount in accordance with claim 1 wherein said lower section is attached to said stand and said upper section is attached to said equipment by means which are covered when the upper and lower sections are assembled.

* * * * *